Sept. 25, 1962 W. A. PAINE II 3,055,383
ELECTRO-HYDRAULIC SERVO SYSTEMS
Original Filed Nov. 1, 1955 2 Sheets-Sheet 1

FIG. I

*INVENTOR.*
WILLIAM A. PAINE II
BY
ATTORNEYS

Sept. 25, 1962 W. A. PAINE II 3,055,383
ELECTRO-HYDRAULIC SERVO SYSTEMS
Original Filed Nov. 1, 1955 2 Sheets-Sheet 2

INVENTOR.
WILLIAM A. PAINE II
BY
ATTORNEYS

United States Patent Office
3,055,383
Patented Sept. 25, 1962

3,055,383
ELECTRO-HYDRAULIC SERVO SYSTEMS
William A. Paine II, Bainbridge Island, Wash.
Original application Nov. 1, 1955, Ser. No. 544,327, now Patent No. 2,954,794, dated Oct. 4, 1960. Divided and this application July 12, 1960, Ser. No. 42,259
6 Claims. (Cl. 137—85)

This system relates to electro-hydraulic servo systems of a closed loop type whereby a single or differential pressure output is made proportional to a low-level electrical input signal. This application is a division of Patent No. 2,954,794.

Among the concerns of the invention is the control of a slide valve through the use of the back pressure of a nozzle which is supplied from a source of high pressure fluid and has a "flapper" arranged to selectively restrict flow therefrom in response to an input signal. An important object of the invention is to provide a feedback arrangement whereby such a flapper always returns to a given neutral position when the output pressure proportional to the input signal is obtained. The term "flapper" as herein used is not intended to be limited to a pivoted member or to an extension of an armature, but is to include any other member, whether it be pivoted, moved bodily, or having a diaphragm action, etc., as long as it has the flow-restricting function.

With yet additional objects and advantages in view which, with the foregoing will appear and be understood in the course of the following description and claims, the invention consists in the novel construction and in the adaptation and combination of parts hereinafter described and claimed.

Figure 1:
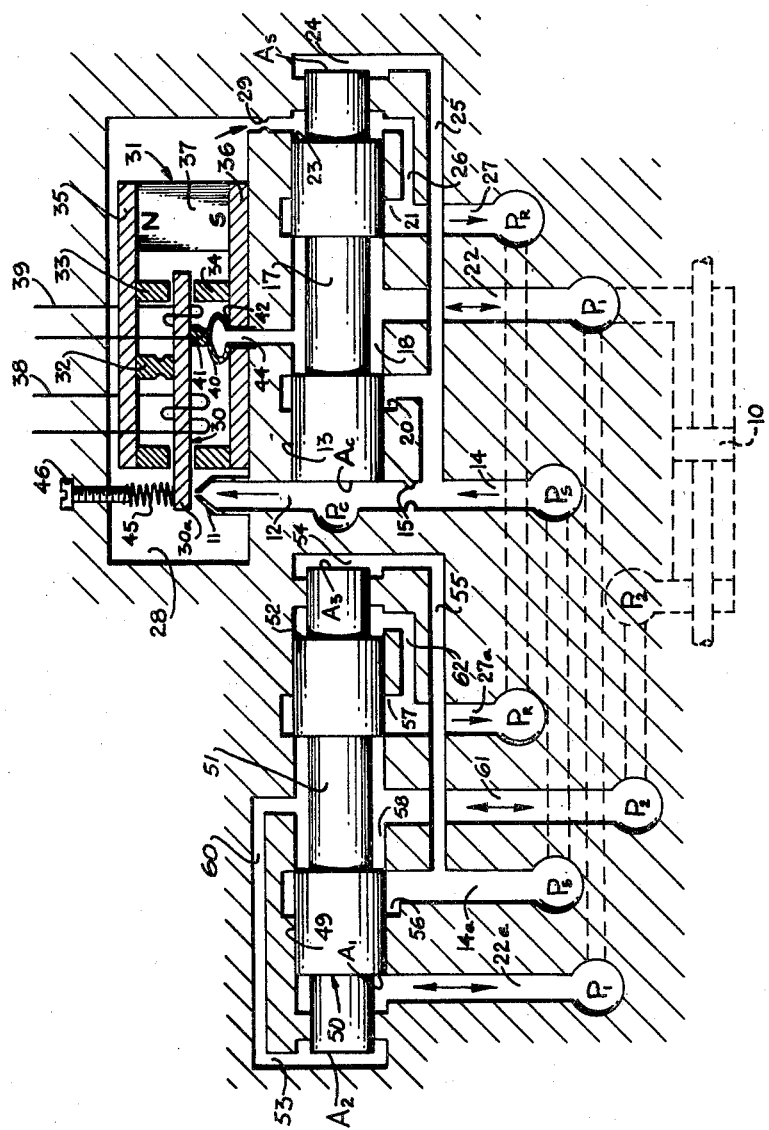
FIG. 1 is a schematic view of the invention and with a possible load in the form of a ram, said ram and the cross-connecting passages between the primary and inverter sections of the invention and those leading to the broken lines.
Figures 2, 3:
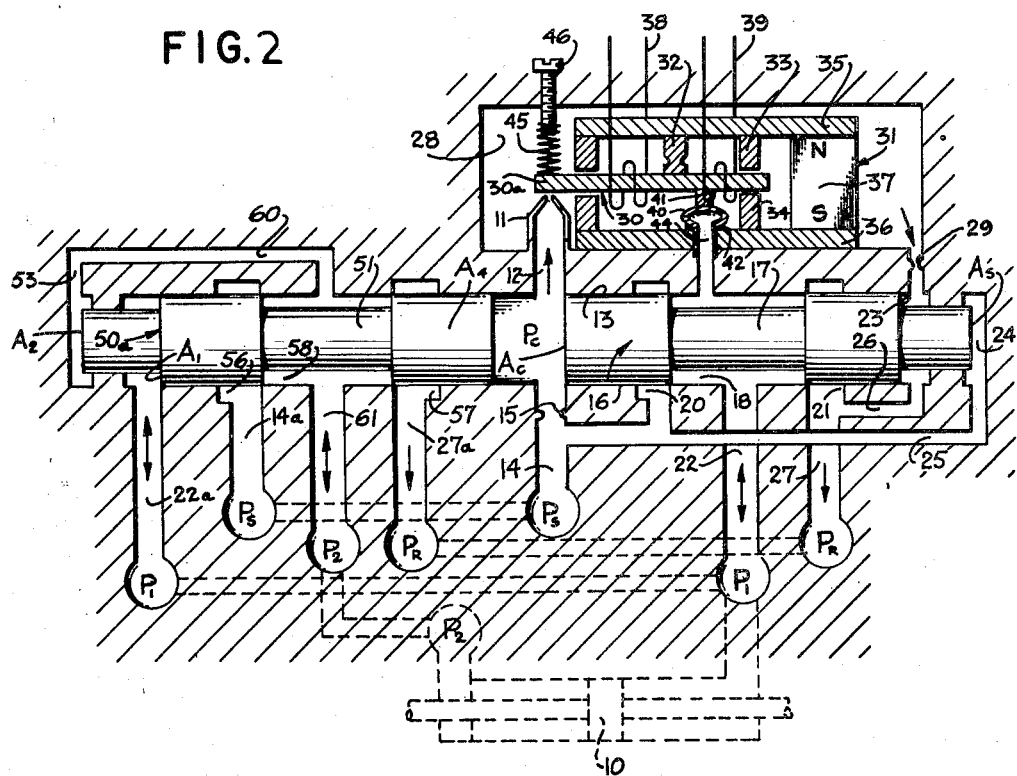
FIG. 2 is a schematic view of the invention with a modified inverter section.
FIG. 3 is an enlarged cross-sectional view of the feedback element.

For a ready understanding of my invention it should be kept in mind that a low powered electrical input signal is converted into a pressure output signal $P_1$, and this output signal is in turn inverted to provide a complementing pressure output signal $P_2$ which is of such a value that the sum of the pressures $P_1$ and $P_2$ equals a constant, and namely a supply pressure $Ps$. The portion of the servo system which converts the electrical input signal into output $P_1$ has been designated the "primary section" and the inversion of $P_1$ to $P_2$, which is illustrated by two alternative devices in FIGS. 1, 2, is termed an "inverter section." For purposes of example the outputs $P_1$, $P_2$ are shown applied to a hydraulic ram actuator 10. The discharge or return fluid from the primary and inverter sections is denoted $Pr$.

*Primary Section*

The supply pressure $Ps$ is reduced to a control pressure $Pc$ by controlling the flow through a nozzle 11 leading from a control chamber 12. This chamber connects with the head of a bore 13 and is fed with supply fluid from a supply passage 14 via a supply orifice 15. A primary slide valve 16 is mounted in the bore 13 and has a reduced center section 17 providing a mixing chamber 18 which selectively connects an output passage 22 with supply and discharge ports 20, 21 comprising annular grooves in the bore 13. The head face of the valve 16 is denoted $Ac$ and is acted upon by $Pc$ whereas the foot end portion of the valve is necked at shoulder 23 to provide a terminal differential area as which is exposed to an end chamber 24. A passage 25 connects this end chamber and the supply port 20 with the supply passage 14. It will be noted that the foot of the bore 13 proper is connected by a drain passage 26 with a discharge passage 27 leading from the port 21 so that fluid pressure cannot build up against the valve shoulder 23.

Flow from the nozzle 11 into a chamber 28 is controlled by a flapper 30a which may be an extension of the armature 30 of a torque motor 31. The fluid discharges from the chamber 28 through a return orifice 29 and into the foot end of the bore proper from whence it can dump via passages 26, 27. It will be noted that the armature 30 is pivoted by means of a hinge 32 mounted midway between the air gaps of two opposed pairs of poles 33, 34. These are supported by respective end plates 35, 36 between which a permanent magnet 37 is clamped. The two coils of the motor are denoted 38, 39 and they are arranged so that application of a differential current thereto causes magnetization of the armature 30. As a result one end of the armature is polarized north and the other south depending on the direction of the differential current. The armature will, therefore, be attracted toward two diagonally opposite of the poles 33, 34 and repelled by the other two poles. These forces of attraction and repulsion result in a rotation of the armature about its hinge 32 and a deflection of the extended flapper and 30a thereof in the vicinity of the nozzle 11. With this arrangement the magnitude of the forces urging deflection of the flapper 30a is proportional to the magnitude of the differential current input signal to the coils 38, 39 and the direction of the motion of the flapper into a more or less restricting position of the nozzle 11 is determined by which of the coils has the larger current.

Armature 30 has three possible torques acting thereon. One is caused by the flow of fluid through the nozzle 11 acting on the flapper portion 30a of the armature. Another is the torque caused by a differential current input to coils 38, 39. The third torque is caused by output pressure $P_1$ acting on a pressure sensitive feedback element which may take the form of a tube 40 which is partially collapsed cross-sectionally and is connected by transfer member 41 with the armature near its pivot point. At its lower side tube 40 is seated in a saddle 42 which is secured to the end plate 36. A tube section 43 extends through the latter and the saddle to tube 40 from a feedback passage 44 which leads from chamber 18 in the bore 13. Accordingly, as output $P_1$ rises the pressure sensitive tube 40 tends to distend toward the armature 30 and exerts a proportional feedback force thereon via the transfer member 41. Similarly, when pressure $P_1$ lowers the tube 40 contracts somewhat away from the armature and hence the feedback force to the armature is reduced proportionally to the output pressure drop.

The equilibrium condition of the primary section is adjusted so that the output pressure $P_1$ will equal the control pressure $Pc$ in chamber 12 when the current differential between coils 38, 39 is zero. With the proper size of nozzle 11 the torque produced by nozzle flow force on the flapper will then be equal to the torque produced by the feed-back element 40. Minute adjustment of the torque balance of the armature is accomplished by varying the setting of an adjusting screw 46. The regulates the loading of a compression spring 45 which acts on the flapper 30a in opposition to the force exerted thereon by the fluid discharging from the nozzle 11. In this equilibrium condition control pressure $Pc$, and hence output pressure $P_1$, will bear the same ratio to the supply pressure $Ps$ as the area ratio $As:Ac$. Normally this area ratio is chosen to be 1:2 to give a maximum range of output pressure changes both above and below the equilibrium value of $P_1$.

As viewed in the drawings the slide valve 16 causes fluid to drain from chamber 18 endwise to the right and it causes supply fluid $P_s$ to be added to this chamber to raise $P_1$ when the valve movement is to the left. Since the supply pressure $P_s$ is desirably held constant the valve is acted upon by a constant force toward the left caused by $P_s$ acting on area $A_s$. This constant force is resisted by the control pressure $P_c$ acting on the area $A_c$, and hence, changes occurring in $P_c$ above or below the equilibrium value of, say ½ $P_s$, will cause the slide valve to move, respectively, to the right or left causing flows from or to chamber 18 resulting in corresponding decreases or increases in the output pressure $P_1$.

For typical operation with a given differential current setting in the torque motor 31, assume that the slide valve is balanced by forces $P_cA_c$ and $P_sA_s$ to the right and left, respectively, and is in a position such that output pressure $P_1$ is equal to control pressure $P_c$. If $P_1$ should then drop in value, the feedback torque exerted by feedback element 40 on the armature 30 would be reduced proportionally thereby causing the armature to turn clockwise about its pivot 32. This would reduce the restriction of the nozzle 11 by the flapper 30a and therefore result in a drop in the control pressure $P_c$ acting on valve area $A_c$. The resultant force unbalance moves the valve to the left allowing flow of fluid from the supply port 20 into chamber 18 and thence to output passage 22 resulting in a pressure increase of output $P_1$. As $P_1$ increases in value the feedback torque also increases causing the armature 30 to turn counterclockwise and brings the flapper end 30a thereof back to its original restricting condition. If $P_1$ should rise in value a reverse operation would occur.

With the primary section again in equilibrium let it be assumed that the differential current input signal to the torque motor changed such as to cause a reduction in the torque input to the armature 30 in the counter-clockwise direction. The flapper 30a would then move away somewhat from the nozzle 11 causing the control pressure $P_c$ to lower the slide valve 16 to move to the left exposing the supply port 20 to chamber 18. The output pressure $P_1$ then increases until the feedback torque exerted on the armature 30 rises an amount equaling the torque unbalance on the armature caused by the original change in the differential current input signal. At this time the flapper 30a will have moved back into its original nozzle-restricting position resulting in a raising of the control pressure $P_c$ to its original equilibrium value of ½ $P_s$. In the reverse manner a change in the differential current input signal, such as to cause an increase in the torque input to the armature in the counterclockwise direction would cause a proportionate drop in the output pressure $P_1$.

Accordingly, it can be seen that since the torque input on the armature 30 is proportional to the current input and the feedback torque is proportional to the output pressure $P_1$, changes in pressure $P_1$ must be proportional to changes in the current applied to the torque motor coils 38, 39. It should be noted that the position of slide valve 16 is dependent upon the flow conditions to and from the load at any particular instant as well as the required output pressure $P_1$. For example, if the load is the ram 10 and flow is taken out of output passage 22 due to ram motion to the left, slide valve 16 will shift to stand to the left of a no flow position to allow $P_1$ to remain at the required value while flow is taken out of the system. Similarly, the slide valve will stand to the right of the no flow position if the cam moves to the right causing reverse flow into the output passage 22.

*Inverter Section*

Referring first to the embodiment shown in FIG. 1, it is seen that such has a bore 49 with a slide valve 50 which is by coincidence similar in shape to valve 16 in that it has a reduced center section 51, a shoulder 52, and differential $A_3$ at the foot end corresponding, respectively, to 17, 23, and $A_s$ of valve 16. The difference in shape between the valves occurs at the head end in that valve 50 is necked to provide differential areas $A_1$ and $A_2$ which normally are selected equal to each other and to area $A_3$. Areas $A_2$ and $A_3$ are exposed to front and foot chambers 53, 54, and the latter connects by passage 55 with a supply passage 14a leading to a supply port 56. This port and the port 57 of a discharge passage 27a are annular grooves in the bore 49 and are spaced apart a distance corresponding to the length of valve section 51. The bore chamber surrounding the valve section is numbered 58 and connects by a passage 60 with front chamber 53 to supply output fluid $P_2$ thereto. An output or load passage 61 leads from bore 49 between the ports 56, 67. The foot of bore 49 has a drain passage 62 connecting with the discharge passage 27a so that pressure cannot build up against shoulder 52.

The output $P_1$ of the primary section becomes the input to the inverter and is fed through passage 22a to the head end of bore 49 so that it will act against area $A_1$. At this point it will be well to note that since $A_1$ and $A_2$ are equal, passages 22a and 60 can be switched so that passage 22a leads to the front chamber 53 and chamber 60 feeds to the head of the bore. In either case, for balancing of valve 50 the sum of pressures $P_1$ and $P_2$ must equal supply pressure $P_s$ since areas $A_1$, $A_2$ and $A_3$ are all equal. For maximum sensitivity the same supply source should be used for the inverter and primary sections so that both will be effected equally by any fluctuations in the supply pressure $P_s$. For the same reason it is desirable that areas $A_3$ and $A_s$ be equal. The inverter of FIG. 1 can be placed in the same or a separate body from that of the primary section and in the former instance particular compactness can be achieved as by placing the slide valves 16, 50 in alinement with the areas $A_s$, $A_3$ faced toward one another in a single chamber consisting of a merger of chambers 24, 54.

In the inverter embodiment of FIG. 2 the foot end of the modified slide valve, denoted 50a, has been altered to expose a valve area $A_4$ equaling the full cross-section of the bore. This valve area is supplied with control fluid $P_c$ and a particularly compact arrangement can be made by alining the valves 16 and 50a in a common bore with the areas $A_c$ and $A_4$ facing one another. Accordingly, passages 55, 62 and foot chamber 54 of the FIG. 2 embodiment are eliminated, but in all other respects the two inverters are identical so that the same identifying numerals have been applied thereto. When pressure $P_c$ equals ½$P_s$ in the equilibrium condition of the primary section, there is no required relationship between the areas of inverter valve 50a and the primary section valve 16 because then the sum of forces $P_1A_1$ and $P_2A_2$ will always equal ½$P_sA_4$ when the system is balanced. Accordingly, the sum of pressures $P_1$ and $P_2$ will equal supply pressure $P_s$ since $A_1$ and $A_2$ each equal ½$A_4$.

However, maximum sensitivity can be expected when area $A_4$ is made equal to area $A_c$ and this relationship must be held if control pressure $P_c$ does not equal ½$P_s$ when primary valve 16 is balanced. In this latter instance the force equation for inverter valve 50a is $P_1A_1$ plus $P_2A_2$ equals $P_cA_4$, and since the force equation for primary valve 16 is $P_cA_c$ equals $P_sA_s$ and $A_c$ equals $A_4$, the inverter equation can be converted to $P_1A_1$ plus $P_2A_2$ equals $P_sA_s$ and results in $P_1$ plus $P_2$ equals $P_s$ since areas $A_1$, $A_2$ and $A_s$ are all equal in the example.

It is thought that the invention and its advantages will have been clearly understood from the foregoing detailed description of the preferred illustrated embodiments. Minor changes in the details of construction may be resorted to without departing from the spirit of the invention and it is therefore my intention that no limitations be implied and that the hereto annexed claims be given the broadest interpretation to which the employed language fairly admits.

What I claim is:

1. In a pressure control system, a valve movable to control an output fluid pressure, opposed hydraulic forces tending to move the valve in opposite directions for varying the output fluid pressure, input means for applying various input forces at will, means operatively associated with said opposed hydraulic forces and said input means and so responding to said various input forces as to correspondingly obtain various differentials between said opposed hydraulic forces and thereby cause respective movements of the valve, and feedback means for automatically converting the output fluid pressure into a feedback force counteracting the particular input force causing such output fluid pressure to responsively eliminate any differential between said opposed hydraulic forces and thereby automatically balance the valve at a position giving an output fluid pressure determined by the magnitude of the particular input force.

2. In a pressure control system, a valve housing having a bore with supply and discharge ports and an output port for the passage of fluid under pressure, a valve movably mounted in said bore for varying the communication of said supply and discharge ports with the output port to control the output fluid pressure at the output port, a constant hydraulic force acting on the valve for increasing the communication of said supply port with the output port, a variable hydraulic force acting on the valve in opposition to said constant hydraulic force for increasing the communication of said discharge port with the output port and having a neutral value at which said valve is balanced, input means for applying various input forces at will, means operatively associated with said input means and said variable hydraulic force and so responding to said various input forces as to correspondingly change said variable hydraulic force and thereby cause respective movements of the valve, and feedback means for automatically converting the output fluid pressure into a feedback force counteracting the particular input force causing said output fluid pressure to responsively return said variable hydraulic force to its neutral value and thereby automatically balance the valve at a position giving an output fluid pressure determined by the magnitude of the particular input force.

3. In a pressure control system, a slide valve movable endwise to control an output fluid pressure, a constant force to one end of the slide valve and a variable hydraulic force to the other end thereof having a neutral value at which the slide valve is balanced, said forces tending to move the valve endwise in opposite directions for varying the output fluid pressure, input means for applying various input forces at will, means operatively associated with said variable hydraulic force and said input means and so responding to said various input forces as to correspondingly change said variable hydraulic force and thereby cause respective endwise movements of the slide valve, and feedback means for automatically converting the output fluid pressure into a feedback force counteracting the particular input force causing such output fluid pressure to responsively return said variable hydraulic force to its neutral value and thereby automatically balance the valve at a position giving an output fluid pressure determined by the magnitude of the particular input force.

4. In a pressure control system, a slide valve having a differential area at one end and movable endwise to control an output fluid pressure, a constant hydraulic force to said differential area, a variable hydraulic force to the other end of the slide valve having a neutral value at which the valve is balanced, said hydraulic forces tending to move the valve endwise in opposite directions for varying the output fluid pressure, input means for applying various input forces at will, means operatively associated with said variable hydraulic force and said input means and so responding to said various input forces as to correspondingly change said variable hydraulic force and thereby cause respective endwise movements of the slide valve, and feedback means for automatically converting the output fluid pressure into a feedback force counteracting the particular input force causing such output fluid pressure to responsively return said variable hydraulic force to its neutral value and thereby automatically balance the valve at a position giving an output fluid pressure determined by the magnitude of the particular input force.

5. In a pressure control system, a slide valve having a differential area at one end and movable endwise to control an output fluid pressure, a supply of fluid under a constant pressure to said differential area, a supply of fluid under a variable pressure to the other end of the slide valve and having a neutral pressure value at which the slide valve is balanced, a nozzle leading from the latter said supply of fluid and controlling said variable pressure by the rate of flow of fluid therethrough, a flapper arranged to restrict the flow from said nozzle and having a neutral position determining said neutral pressure value of the supply of fluid controlled by the nozzle, means for applying various input forces at will to the flapper to correspondingly vary the restriction to flow from the nozzle and thus vary said variable pressure to thereby cause respective endwise movements of the slide valve, and feedback means operatively associated with said flapper for automatically converting the output fluid pressure into a feedback force counteracting the particular input force on the flapper causing such output fluid pressure to responsively return said flapper to its neutral position and thereby automatically balance the slide valve at an endwise position giving an output fluid pressure determined by the magnitude of the particular input force.

6. In a pressure control system, a slide valve having a differential area at one end and movable endwise to control an output fluid pressure, a supply of fluid under a constant pressure to said differential area, a supply of fluid under a variable pressure to the other end of the slide valve and having a neutral pressure value at which the slide valve is balanced, a nozzle leading from the latter said supply of fluid and controlling said variable pressure by the rate of flow of fluid therethrough, a flapper arranged to restrict the flow from said nozzle and having a neutral position determining said neutral pressure value of the supply of fluid controlled by the nozzle, a torque motor having said flapper operatively associated with its armature so that by applying various differential currents to the motor at will, responsive input forces will be applied to the flapper to correspondingly vary the restriction to flow from the nozzle and thus vary said variable pressure to thereby cause respective endwise movements of the slide valve, and feedback means operatively associated with said flapper for automatically converting the output fluid pressure into a feedback force counteracting the particular input force on the flapper causing such output fluid pressure to responsively return said flapper to its neutral position and thereby automatically balance the slide valve at an endwise position giving an output fluid pressure determined by the magnitude of the particular input force.

No references cited.